United States Patent
Lin (10) Patent No.: US 10,481,738 B2
(45) Date of Patent: Nov. 19, 2019

(54) LIGHT TOUCH APPARATUS

(71) Applicant: inFilm Optoelectronic Inc., New Taipei (TW)

(72) Inventor: Chih-Hsiung Lin, New Taipei (TW)

(73) Assignee: inFilm Optoelectronic Inc., New Taipei (TW)

( * ) Notice: Subject to any disclaimer, the term of this patent is extended or adjusted under 35 U.S.C. 154(b) by 0 days.

(21) Appl. No.: 16/057,389

(22) Filed: Aug. 7, 2018

(65) Prior Publication Data
US 2019/0065003 A1 Feb. 28, 2019

(30) Foreign Application Priority Data
Aug. 22, 2017 (CN) .......................... 2017 1 0724870

(51) Int. Cl.
| | |
|---|---|
| G06F 3/042 | (2006.01) |
| G06F 3/01 | (2006.01) |
| G03B 21/20 | (2006.01) |
| G06F 3/041 | (2006.01) |

(52) U.S. Cl.
CPC ....... G06F 3/0421 (2013.01); G03B 21/2033 (2013.01); G03B 21/2066 (2013.01); G06F 3/016 (2013.01); G06F 3/0412 (2013.01)

(58) Field of Classification Search
CPC ... G06F 3/0421; G06F 3/016; G03B 21/2033; G03B 21/2066

USPC ......................................................... 345/175
See application file for complete search history.

(56) References Cited

U.S. PATENT DOCUMENTS

| | | | |
|---|---|---|---|
| 2006/0158435 A1* | 7/2006 | Lin ...................... | G06F 3/0425 345/168 |
| 2006/0209631 A1* | 9/2006 | Melese .................... | A61B 5/11 367/7 |
| 2012/0069169 A1* | 3/2012 | Dejima ................. | G06F 3/0426 348/77 |

* cited by examiner

Primary Examiner — Jonathan M Blancha
(74) Attorney, Agent, or Firm — Rabin & Berdo, P.C.

(57) ABSTRACT

A light touch apparatus includes a light emitting unit, an imaging unit, an optical signal processing unit, and a position processing unit. The light emitting unit emits a projection light ray. The imaging unit captures an external image, where the external image includes multiple two-dimensional pixels, and corresponding to relative positions of the two-dimensional pixels, the projection light ray of the light emitting unit forms multiple projection spots. The optical signal processing unit receives multiple pieces of reflection light information, and analyzes the pieces of reflection light information to correspondingly generate multiple pieces of analysis spot information, where the pieces of analysis spot information include touch vibration information, and the touch vibration information includes a touch vibration wave whose frequency domain is different from a frequency domain of the projection light ray. The position processing unit calculates a touch position according to the touch vibration information.

10 Claims, 5 Drawing Sheets

LIGHT TOUCH APPARATUS

CROSS-REFERENCE TO RELATED APPLICATION

This non-provisional application claims priority under 35 U.S.C. § 119(a) to Patent Application No. 201710724870.7 filed in China, P.R.C. on Aug. 22, 2017, the entire contents of which are hereby incorporated by reference.

BACKGROUND

Technical Field

The present invention relates to a touch apparatus, and in particular, to a light touch apparatus.

Related Art

Currently, an existing projection light touch apparatus mainly includes a light source, a camera, and a processor. The light source may project light rays to a screen, and an area that is irradiated on the screen forms an operation area. When there is an object in the operation area, the object blocks some light rays emitted by the light source to the screen, to form an object shadow corresponding to the object on the screen. Images of the object, the object shadow, and the operation area are captured by using the camera, and an image of a contact point at which the object is in contact with the object shadow is read by using the processor, so that the processor analyzes position information of the contact point in the image by means of an image analysis technology.

Another existing projection touch apparatus includes an outer frame for defining a detection area. Multiple light emitting components and a light equalizing layer configured to perform light equalization on light sources generated by the light emitting components are disposed on a side wall of the outer frame, and a camera configured to photograph and record the detection area is disposed at the corner of the outer frame. The camera is electrically connected to a control apparatus for image analysis and positioning. When a user taps and touches the detection area, the light source is blocked at a touch position. In addition, the camera transmits an image captured and recorded in the detection area to the control apparatus, for image positioning and analysis, to determine the touch position.

For both of the foregoing two existing projection touch apparatuses, a touch position is determined by light blocking. Consequently, a problem of inaccurate determining due to impact from other surrounding light rays is caused easily. In addition, an existing projection touch apparatus needs to project a light source to a flat surface, to avoid a case in which determining accuracy is affected due to non-uniform light reflection.

SUMMARY

In view of this, in an embodiment, a projection light touch apparatus includes a light emitting unit, an imaging unit, an optical signal processing unit, and a position processing unit. The light emitting unit emits a projection light ray. The imaging unit captures an external image, where the external image includes multiple two-dimensional pixels, and corresponding to relative positions of the two-dimensional pixels, the projection light ray of the light emitting unit forms multiple projection spots. The optical signal processing unit is electrically connected to the imaging unit, and receives multiple pieces of reflection light information, where the pieces of reflection light information are respectively reflected from the projection spots, and the optical signal processing unit can further analyze the pieces of reflection light information to correspondingly generate multiple pieces of analysis spot information, where the pieces of analysis spot information include at least one piece of touch vibration information, and the at least one piece of touch vibration information includes a touch vibration wave whose frequency domain is different from a frequency domain of the projection light ray. The position processing unit is electrically connected to the optical signal processing unit. The position processing unit receives the at least one piece of touch vibration information, and the position processing unit calculates a touch position according to the at least one piece of touch vibration information, where the touch position is a relative epicenter position at which the touch vibration wave is generated.

In another embodiment, a scanning-type light touch apparatus includes a scanning unit, an optical signal processing unit, and a position processing unit. The scanning unit emits a scanning beam and generates multiple scanning spots. The optical signal processing unit receives multiple pieces of reflection light information that are respectively reflected from the scanning spots. The optical signal processing unit can further analyze the pieces of reflection light information to correspondingly generate multiple pieces of analysis spot information, where the pieces of analysis spot information include at least one piece of touch vibration information, and the at least one piece of touch vibration information includes a touch vibration wave whose frequency domain is different from a frequency domain of the scanning beam. The position processing unit is electrically connected to the optical signal processing unit, and receives the at least one piece of touch vibration information. The position processing unit calculates a touch position according to the at least one piece of touch vibration information, where the touch position is a relative epicenter position at which the touch vibration wave is generated.

In the foregoing embodiments, the light touch apparatus obtains, by using the imaging unit or the scanning unit, positions of multiple spots formed through projection of a light ray, and when there is a touch operation on a spot irradiated by the light ray (a scanning beam or a projection light ray), the light touch apparatus may analyze, by using the optical signal processing unit, reflection light information reflected by the spot, to obtain touch vibration information generated due to vibration caused by the touch, and calculate a touch position according to the touch vibration information. Therefore, in the embodiments of the present invention, the touch position is calculated by using the touch vibration information, so that impact from other surrounding light rays can be avoided, thereby improving position determining accuracy. In addition, a limitation of use on a flat projected surface can be removed, thereby greatly improving practicability.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1:
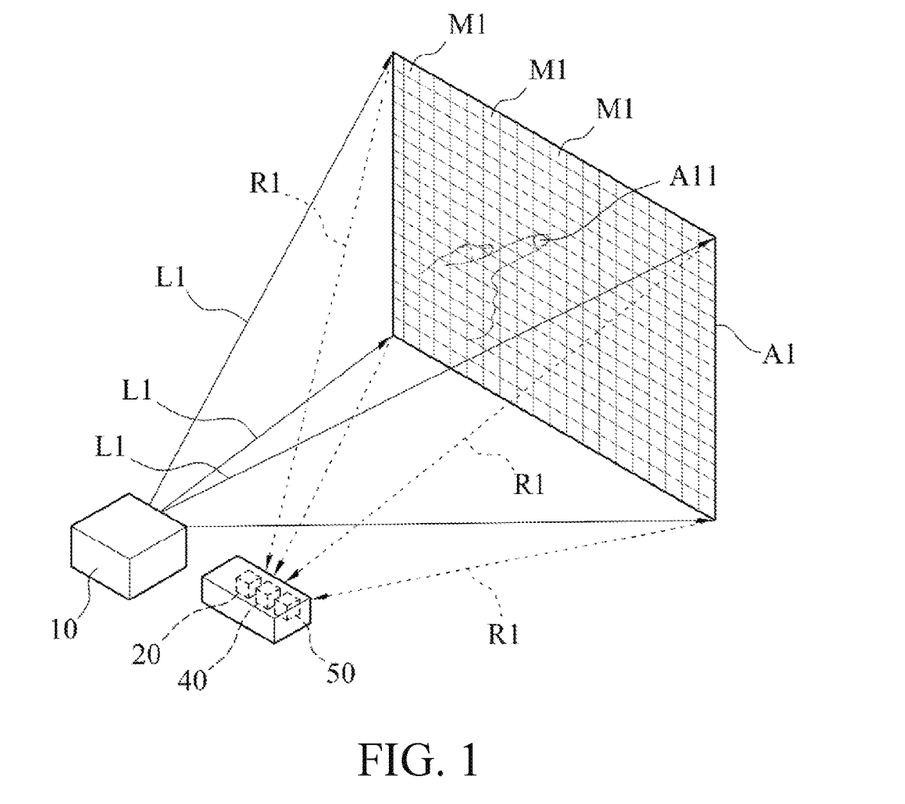
FIG. 1 is a schematic touch diagram of an embodiment of a projection light touch apparatus according to the present invention.
Figure 2:
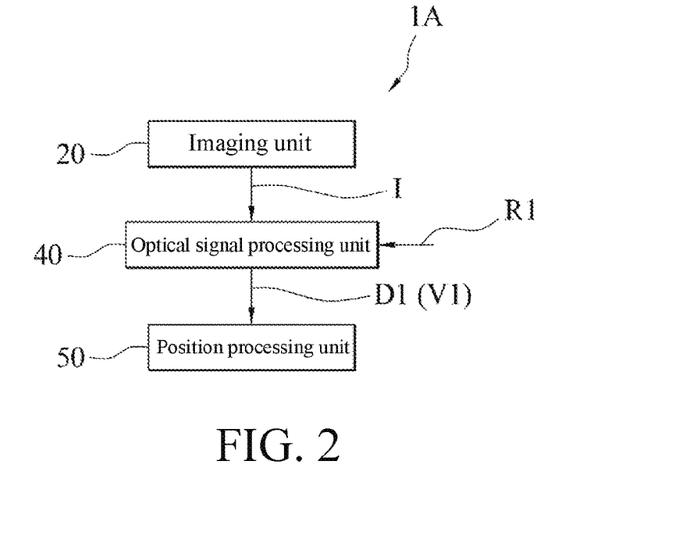
FIG. 2 is a hardware block diagram of an embodiment of a projection light touch apparatus according to the present invention.

FIG. 1 is a schematic touch diagram of an embodiment of a projection light touch apparatus according to the present invention, and FIG. 2 is a hardware block diagram of an embodiment of a projection light touch apparatus according to the present invention. As shown in FIG. 1 and FIG. 2, in this embodiment, a projection light touch apparatus 1A includes a light emitting unit 10, an imaging unit 20, an optical signal processing unit 40, and a position processing unit 50.

As shown in FIG. 1, the light emitting unit 10 may be specifically a projection light source, for example, a light-emitting diode (LED) or another light emitting element (for example, a halogen lamp or an infrared lamp or a laser source), or the light emitting unit 10 may be a projector (for example, an LED micro projector or a laser micro projector). The light emitting unit 10 may emit a projection light ray L1 to correspondingly irradiate a surface of an object (for example, a desktop, a wall surface, a ground, or a curtain) having a reflection function, and the object may reflect the projection light ray L1 to form a luminescent projection operation area A1, so that a user performs a touch input in the projection operation area A1.

In an embodiment, the imaging unit 20 may be a camera or an image sensor. For example, the image sensor may be a charge-coupled device (CCD) or a complementary metal-oxide-semiconductor (CMOS) active pixel sensor. Alternatively, the imaging unit 20 may be a time-of-flight (TOF) sensor or an image sensor that can perform demodulation.

Figure 4:
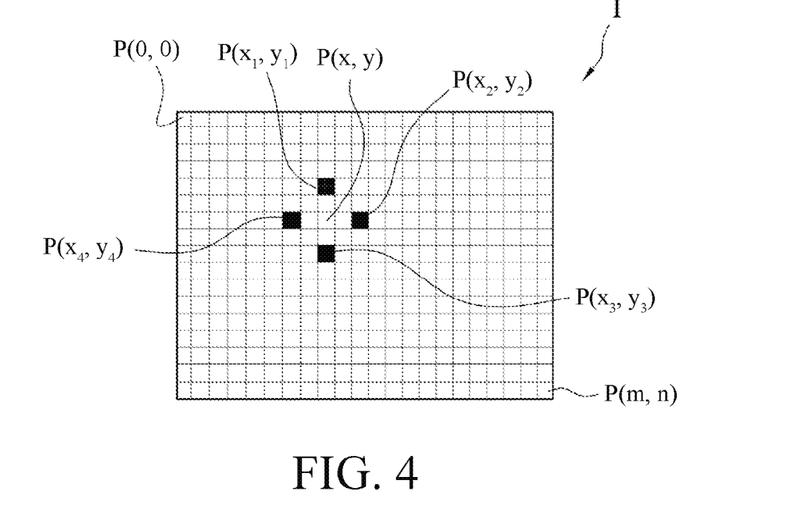
FIG. 4 is a schematic diagram of image capturing of an embodiment of a projection light touch apparatus according to the present invention.

As shown in FIG. 1, the imaging unit 20 may be disposed towards a direction of the projection operation area A1. Because the projection operation area A1 is irradiated by the projection light ray L1 to generate a reflection light ray, the imaging unit 20 can collect and capture the reflection light ray corresponding to the projection operation area A1, to obtain an external image I through imaging (as shown in FIG. 4). That the external image I obtained by the imaging unit 20 includes multiple two-dimensional pixels P and relative positions thereof is already self-defined during imaging by the imaging unit 20, and corresponding to the relative positions of the two-dimensional pixels P, the projection light ray L1 of the light emitting unit 10 may form multiple projection spots M1. Further, the reflection light ray formed by irradiating the projection operation area A1 by the projection light ray L1 emitted by the light emitting unit 10 may be considered as light collectively emitted from the multiple projection spots M1 that are arranged according to the relative positions of the two-dimensional pixels P. As shown in FIG. 1, in this embodiment, each of the multiple projection spots M1 is indicated by a grid, but a shape of the projection spot M1 is not limited. The imaging unit 20 may obtain a position of each two-dimensional pixel P in the external image I according to light rays reflected by the multiple projection spots M1. For example, as shown in FIG. 4, assuming that the external image I has 900×1500=1350000 pixels in total, the imaging unit 20 may learn of the position of each pixel according to the light rays reflected by the multiple projection spots M1, to define the 1350000 two-dimensional pixels P. As shown in FIG. 4, the external image I includes multiple two-dimensional pixels P(0, 0) to P(m, n) that are arranged in an array and correspond to the multiple projection spots M1.

In an embodiment, the optical signal processing unit 40 may be specifically a micro processor, a micro controller, a field programmable gate array, a logical circuit, or the like. As shown in FIG. 1 and FIG. 2, the optical signal processing unit 40 may receive multiple pieces of reflection light information R1 that are respectively reflected from the multiple projection spots M1, and the optical signal processing unit 40 can analyze the pieces of reflection light information R1, to correspondingly generate multiple pieces of analysis spot information D. When the user performs a touch input in the projection operation area A1, a piece of touch vibration information V1 may be generated at a touched position in the projection operation area A1. For example, as shown in FIG. 1, the user touches a position in the projection operation area A1 with a finger, to form a touch point A11. The touch point A11 may correspond to a position of one of the projection spots M1. Further, referring to FIG. 1 and FIG. 3, touch vibration information V1 generated at the touched touch point A11 includes a touch vibration wave W1, that is, the touch vibration wave W1 is a vibration wave generated when the object is touched, and the touch vibration wave W1 gradually spreads in all directions. Assuming that the surface of the object irradiated by the projection light ray L1 is a uniform flat surface, the touch vibration wave W1 uniformly spreads to the periphery. The touch vibration information V1 may be transmitted to the optical signal processing unit 40 along with the reflection light information R1 reflected from the projection operation area A1, and the optical signal processing unit 40 can analyze the reflection light information R1 including the touch vibration information V1, to obtain the touch vibration wave W1 in the touch vibration information V1.

In an embodiment, a frequency domain of the touch vibration wave W1 is different from a frequency domain of the projection light ray L1. For example, the frequency domain of the projection light ray L1 emitted by the light emitting unit 10 may be a high frequency (HF) (for example, 3 MHz to 300 MHz), and the frequency domain of the touch vibration wave W1 may be a low frequency (LF) (for example, below 3 kHz). The foregoing frequency values are merely examples, and the present invention is not limited thereto. Alternatively, the LF may be 3 kHz to 30 kHz, 300 Hz to 3 kHz, or 30 Hz to 300 Hz. The optical signal processing unit 40 may obtain through analysis the touch vibration wave W1 by using a difference between the frequency domains of the touch vibration wave W1 and the projection light ray L1.

In an embodiment, the light emitting unit 10 may be a light modulation unit, so that the emitted projection light ray L1 is a modulation signal light ray (modulation lighting), for example, the projection light ray L1 may be an HF signal light ray falling within 3 MHz to 300 MHz, and the reflection light information R1 reflected from the touch point A11 is correspondingly modulation reflection light information (including the touch vibration information V1); and the optical signal processing unit 40 may demodulate the modulation reflection light information according to a Fourier transformation formula, to generate analysis spot information D1 to obtain the touch vibration wave W1. The frequency domains of the touch vibration wave W1 and the projection light ray L1 are merely examples, and actually, the two frequency domains only need to be different frequency domains. For example, the frequency domain of the touch vibration wave W1 may be an LF, a very low frequency (VLF), a ultra low frequency (ULF), or a super low frequency (SLF), and the frequency domain of the projection light ray L1 may be a medium frequency (MF), an HF, a very high frequency (VHF), a ultra high frequency (UHF), or a super high frequency (SHF). This is not limited in this embodiment. In addition, the projection light ray L1 and the reflection light information R1 are modulation signal light rays, to avoid interference from/to other surrounding frequency signal light rays, so that the optical signal processing unit 40 can more accurately and rapidly generate the analysis spot information D1.

Figure 3:
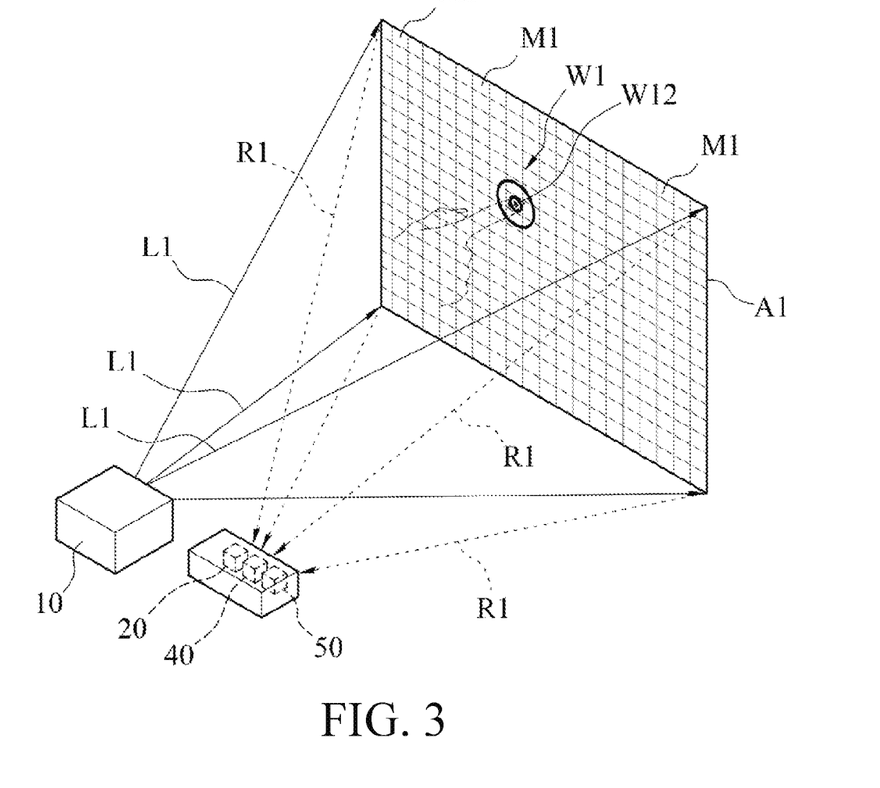
FIG. 3 is a schematic diagram of a vibration wave of an embodiment of a projection light touch apparatus according to the present invention.
Figure 5:
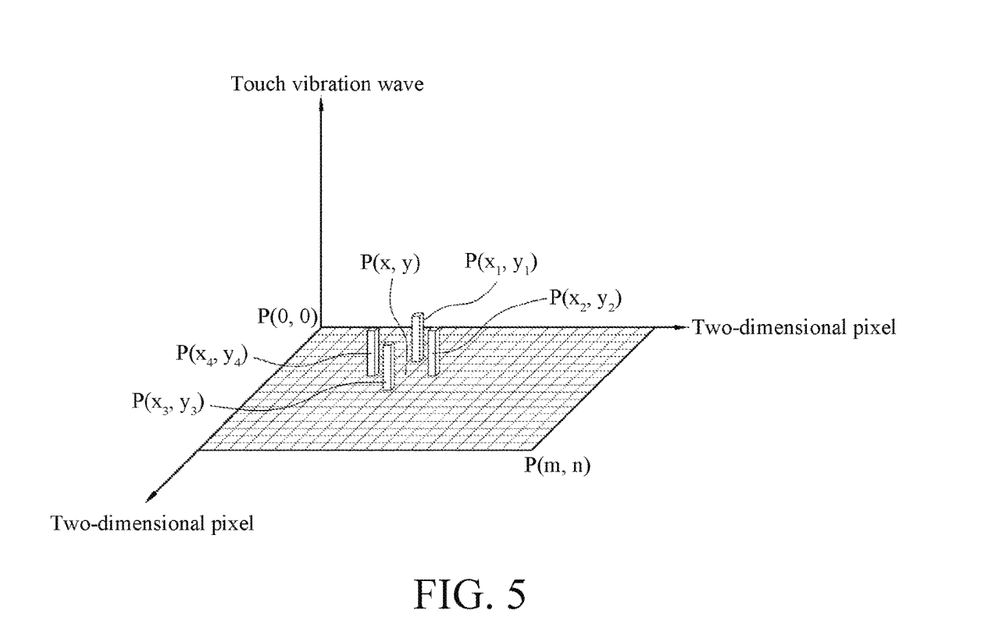
FIG. 5 is a schematic analysis diagram of an embodiment of a projection light touch apparatus according to the present invention.

As shown in FIG. 1 and FIG. 2, the position processing unit 50 may be specifically a micro processor, a micro controller, a field programmable gate array, a logical circuit, or the like. The position processing unit 50 is electrically connected to the optical signal processing unit 40 and the imaging unit 20, and the position processing unit 50 may receive the touch vibration information V1 analyzed by the optical signal processing unit 40, and calculate a touch position according to the touch vibration information V1. For example, because the touch vibration information V1 is transmitted to the optical signal processing unit 40 along with the reflection light information R1 reflected from the projection operation area A1, the position processing unit 50 may learn of a position at which the touch vibration wave W1 is generated. Referring to FIG. 3, FIG. 4, and FIG. 5, FIG. 5 shows a relationship between the touch vibration wave W1 and two-dimensional pixels P. When the user touches the position in the projection operation area A1 with a finger, to form the touch point A11 and generate the touch vibration wave W1 (as shown in FIG. 1 and FIG. 3), because the touch vibration wave W1 is a vibration wave that spreads outward, the position processing unit 50 may learn, according to the external image I and the touch vibration information V1, of the position at which the touch vibration wave W1 is generated and two-dimensional pixels $P(x_1, y_1)$, $P(x_2, y_2)$, $P(x_3, y_3)$, and $P(x_4, y_4)$ corresponding to the touch vibration wave W1, and obtain a two-dimensional pixel $P(x, y)$ of a relative central position according to the two-dimensional pixels $P(x_1, y_1)$, $P(x_2, y_2)$, $P(x_3, y_3)$, and $P(x_4, y_4)$, where the two-dimensional pixel $P(x, y)$ corresponds to a relative epicenter position W12 of the touch vibration wave W1 (as shown in FIG. 3), to obtain a touch position (that is, $P(x, y)$) of the touch point A11. Therefore, in this embodiment of the present invention, the touch position is calculated by using the touch vibration information V1, so that impact from other surrounding light rays can be avoided, thereby improving position determining accuracy. In addition, the projection light touch apparatus 1A is not limited to being used on a flat projected surface, for example, the projection light touch apparatus 1A is applicable to a rugged surface or a surface with a height difference, thereby greatly improving practicability.

Figure 6:
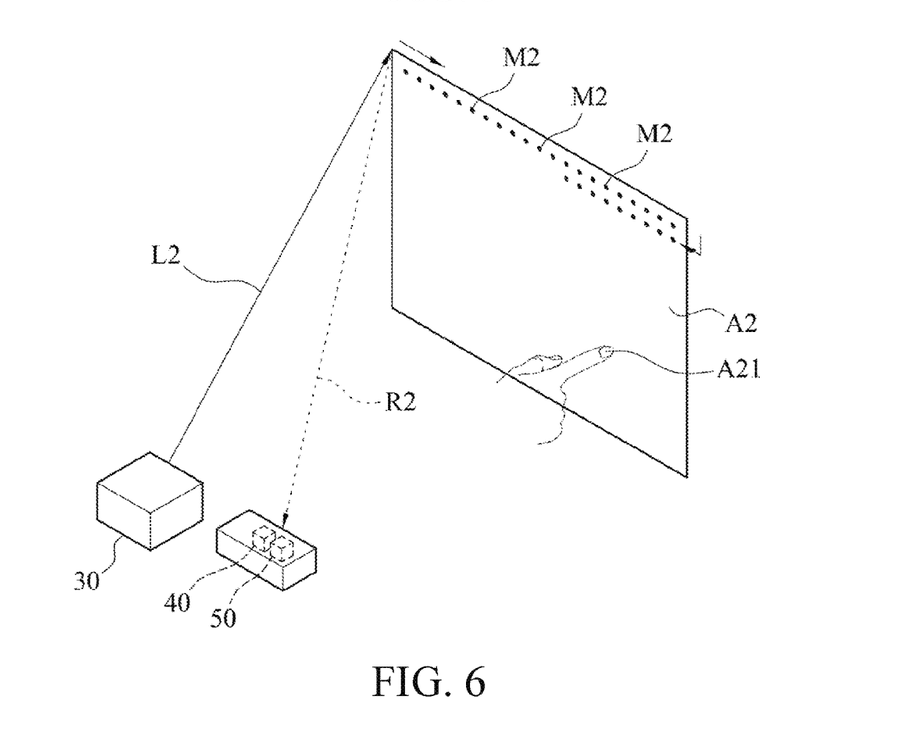
FIG. 6 is a schematic touch diagram of an embodiment of a scanning-type light touch apparatus according to the present invention.
Figure 7:
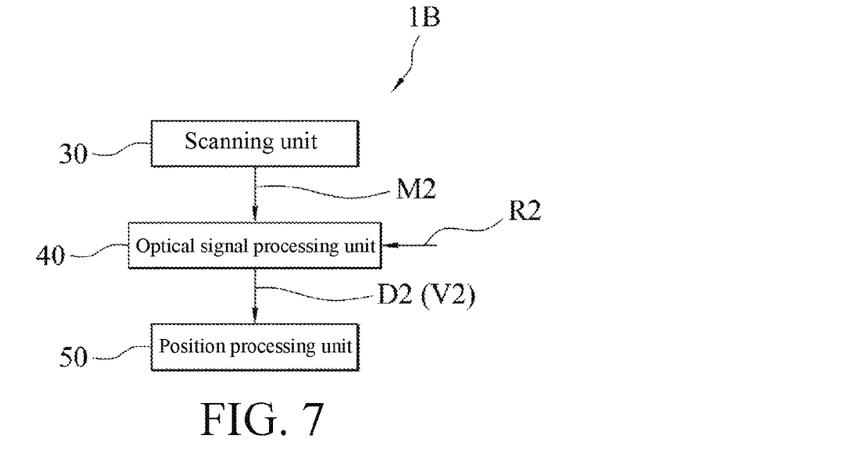
FIG. 7 is a hardware block diagram of an embodiment of a scanning-type light touch apparatus according to the present invention.

FIG. 6 and FIG. 7 are respectively a schematic touch diagram and a hardware block diagram of an embodiment of a scanning-type light touch apparatus according to the present invention. A scanning-type light touch apparatus 1B in this embodiment includes a scanning unit 30, an optical signal processing unit 40, and a position processing unit 50.

Figure 9:
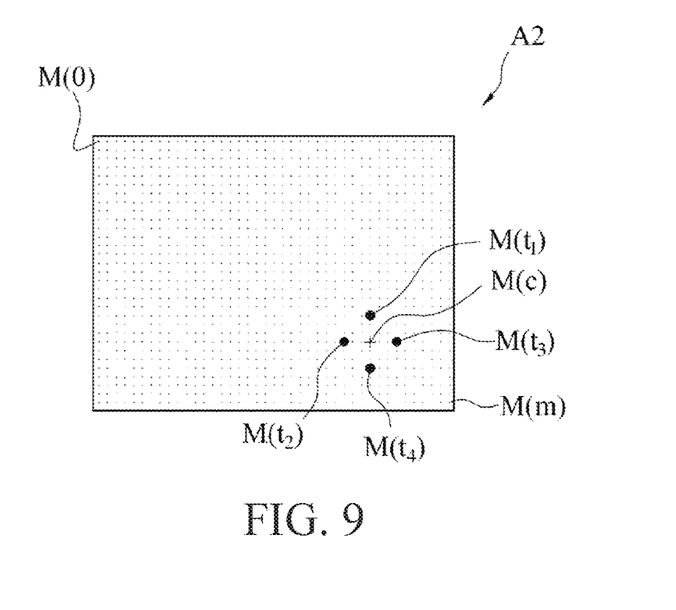
FIG. 9 is a schematic diagram of image capturing of an embodiment of a scanning-type light touch apparatus according to the present invention.

As shown in FIG. 6 and FIG. 7, the scanning unit 30 may emit a scanning beam L2 to scan a surface of an object (for example, a desktop, a wall surface, a ground, or a curtain) having a reflection function, to generate an operation area A2 and multiple scanning spots M2 in the operation area A2. A user may perform a touch input in the operation area A2. Further, the scanning beam L2 emitted by the scanning unit 30 may perform scanning along a path. For example, as shown in FIG. 6, the scanning beam L2 may perform repeated scanning from the upper left corner of the operation area A2 from left to right, top to bottom, and the scanning beam L2 may complete one scanning operation in the operation area A2 in a scanning period (for example, 0.01 second to 0.1 second). After the scanning unit 30 performs scanning, the multiple scanning spots M2 are generated and a position of each scanning spot M2 is obtained. Herein, only several scanning spots M2 are drawn for an example, and actually, the multiple scanning spots M2 may be filled in an entire operation area A2. For example, as shown in FIG. 9, after the scanning unit 30 obtains the position of each scanning spot M2, the positions of the multiple scanning spots M2 may be defined as M(t) to M(m).

In an embodiment, the scanning unit 30 may be a laser range scanner, to emit a laser beam to scan the surface of the object. In a different embodiment, the scanning unit 30 may be an infrared scanning unit or an MEMS scanning unit.

As shown in FIG. 6 and FIG. 7, the optical signal processing unit 40 may be disposed in a reflection direction of the operation area A2, to receive multiple pieces of reflection light information R2 that are respectively reflected from the multiple scanning spots M2, and the optical signal processing unit 40 can analyze the pieces of reflection light information R2, to correspondingly generate multiple pieces of analysis spot information D2. When the user performs a touch input in the operation area A2, touch vibration information V2 may be generated at a touched position in the operation area A2. For example, as shown in FIG. 6, the user touches another position in the operation area A2 with a finger, to form a touch point A21. The touch point A21 may correspond to a position of one of the scanning spots M2. Further, referring to FIG. 6, FIG. 7, and FIG. 8, the touch vibration information V2 generated at the touched touch point A21 includes a touch vibration wave W2. That is, the touch vibration wave W2 is a vibration wave generated when the object is touched, and the touch vibration wave W2 gradually spreads in all directions. When the scanning beam L2 scans a position (for example, a position corresponding to $M(t_1)$, $M(t_2)$, $M(t_3)$, or $M(t_4)$ in FIG. 9) having the touch vibration wave W2 in the operation area A2, the touch vibration information V2 may be transmitted to the optical signal processing unit 40 along with the reflection light information R2 reflected from the operation area A2, and the optical signal processing unit 40 can analyze the reflection light information R2 including the touch vibration information V2, to obtain the touch vibration wave W2 in the touch vibration information V2.

In an embodiment, a frequency domain of the touch vibration wave W2 is different from a frequency domain of the scanning beam L2. For example, the frequency domain of the scanning beam L2 emitted by the scanning unit 30 may be an HF (for example, 3 MHz to 300 MHz), and the frequency domain of the touch vibration wave W2 may be an LF (for example, below 3 kHz). The foregoing frequency values are merely examples, and the present invention is not limited thereto. Alternatively, the LF may be 3 kHz to 30 kHz, 300 Hz to 3 kHz, or 30 Hz to 300 Hz. The optical signal processing unit 40 may obtain through analysis the vibration wave W2 by using a difference between the frequency domains of the touch vibration wave W2 and the scanning beam L2.

In an embodiment, the scanning unit 30 may be a light modulation unit, so that the emitted scanning beam L2 is a modulation signal light ray (modulation lighting), for example, the scanning beam L2 may be an HF signal light ray falling within 3 MHz to 300 MHz, and the reflection light information R2 reflected from the touch point A21 is correspondingly modulation reflection light information (including the touch vibration information V2); and the optical signal processing unit 40 may demodulate the modulation reflection light information according to a Fourier transformation formula, to generate analysis spot information D2 to obtain the touch vibration wave W2. The frequency domains of the touch vibration wave W2 and the scanning beam L2 are merely examples, and actually, the two frequency domains only need to be different frequency domains. For example, the frequency domain of the touch vibration wave W2 may be an LF, a VLF, a ULF, or an SLF, and the frequency domain of the scanning beam L2 may be an MF, an HF, a VHF, a UHF, or an SHF. This is not limited in this embodiment. In addition, the scanning beam L2 and the reflection light information R2 are modulation signal light rays, to avoid interference from/to other surrounding frequency signal light rays, so that the optical signal processing unit 40 can more accurately and rapidly generate the analysis spot information D2.

Figure 8:
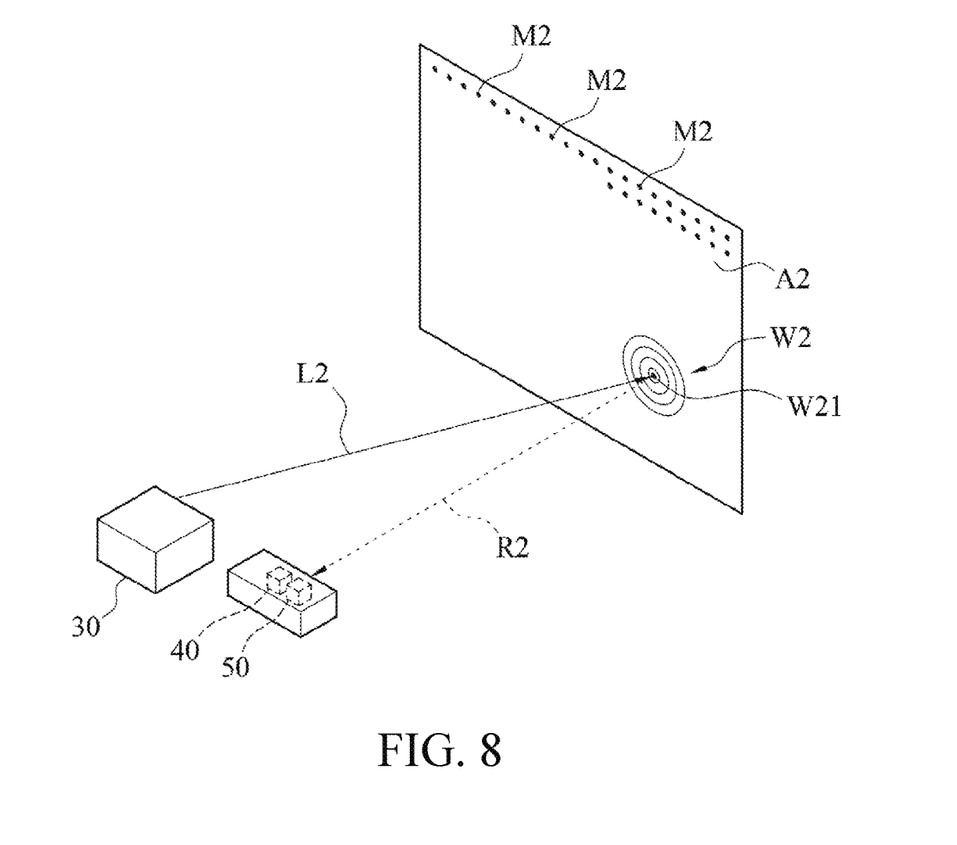
FIG. 8 is a schematic diagram of a vibration wave of an embodiment of a scanning-type light touch apparatus according to the present invention.
Figure 10:
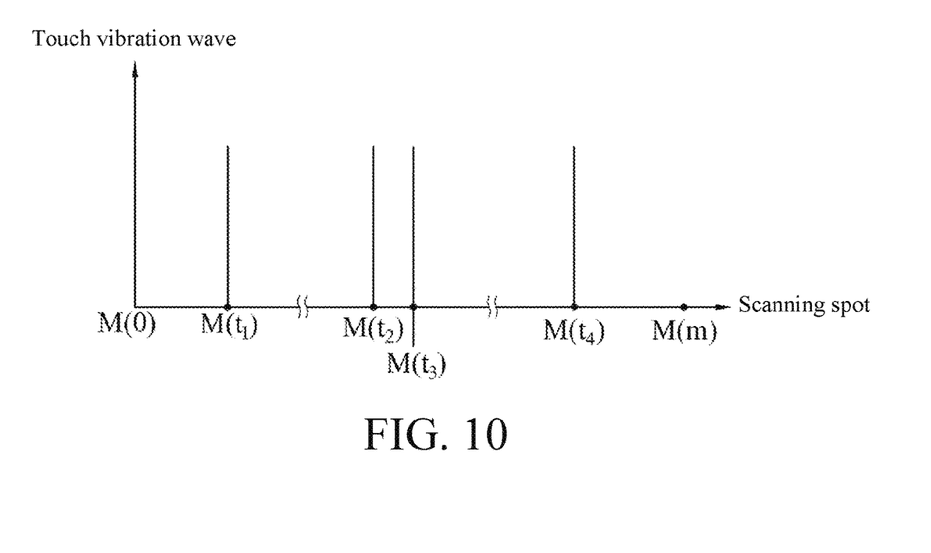
FIG. 10 is a schematic analysis diagram of an embodiment of a scanning-type light touch apparatus according to the present invention.

As shown in FIG. 6 and FIG. 7, the position processing unit 50 may be specifically a micro processor, a micro controller, a field programmable gate array, a logical circuit, or the like. The position processing unit 50 is electrically connected to the optical signal processing unit 40 and the scanning unit 30, and the position processing unit 50 may receive the touch vibration information V2 analyzed by the optical signal processing unit 40, and calculate a touch position according to the touch vibration information V2. For example, because the touch vibration information V2 is transmitted to the optical signal processing unit 40 along with the reflection light information R2 reflected from the touch point A21, the position processing unit 50 may learn of a position at which the touch vibration wave W2 is generated. Referring to FIG. 8, FIG. 9, and FIG. 10, FIG. 10 shows a relationship between the touch vibration wave W2 and scanning spots M2. When the user touches the position in the projection the operation area A2 with a finger, to form the touch point A21 and generate the touch vibration wave W2 (as shown in FIG. 6 and FIG. 8), the position processing unit 50 may learn, according to the touch vibration information V2, of scanning spots $M(t_1)$, $M(t_2)$, $M(t_3)$, and $M(t_4)$ corresponding to the touch vibration wave W2, and obtain a scanning spot M(c) of a relative central position according to the scanning spots $M(t_1)$, $M(t_2)$, $M(t_3)$, and $M(t_4)$, where the scanning spot M(c) corresponds to a relative epicenter position W21 of the touch vibration wave W2, to obtain a touch position (that is, M(c)) of the touch point A21. Therefore, in this embodiment of the present invention, the touch position is calculated by using the touch vibration information V2, so that impact from other surrounding light rays can be avoided, thereby improving position determining accuracy. In addition, the scanning-type light touch apparatus 1B is not limited to being used on a flat projected surface, for example, the scanning-type light touch apparatus 1B is applicable to a rugged surface or a surface with a height difference, thereby greatly improving practicability.

Although the technical content of the present invention has been disclosed above by using the preferred embodiments, the embodiments are not intended to limit the present invention. Some variations or refinements that are made by any person skilled in the art without departing from the spirit of the present invention shall fall within the scope of the present invention. Therefore, the protection scope of the present invention shall be subject to the scope defined by the appended claims.

What is claimed is:

1. A projection light touch apparatus, comprising:
   a light emitting unit, emitting a projection light ray;
   an imaging unit, capturing an external image, wherein the external image comprises multiple two-dimensional pixels, and corresponding to relative positions of the two-dimensional pixels, the projection light ray of the light emitting unit forms multiple projection spots;
   an optical signal processing unit, electrically connected to the imaging unit, and receiving multiple pieces of reflection light information, wherein the pieces of reflection light information are respectively reflected from the projection spots, and the optical signal processing unit can further analyze the pieces of reflection light information to correspondingly generate multiple pieces of analysis spot information, wherein the pieces of analysis spot information comprise at least one piece of touch vibration information, and the at least one piece of touch vibration information comprises a touch vibration wave whose frequency domain is different from a frequency domain of the projection light ray; and
   a position processing unit, electrically connected to the optical signal processing unit, wherein the position processing unit receives the at least one piece of touch vibration information, and the position processing unit calculates a touch position according to the at least one piece of touch vibration information, wherein the touch position is a relative epicenter position at which the touch vibration wave is generated.

2. The projection light touch apparatus according to claim 1, wherein the light emitting unit is a light modulation unit, the projection light ray is a modulation signal light ray, and each piece of reflection light information is a piece of modulation reflection light information.

3. The projection light touch apparatus according to claim 2, wherein the optical signal processing unit demodulates the pieces of modulation reflection light information according to a Fourier transformation formula, to generate the pieces of analysis spot information.

4. The projection light touch apparatus according to claim 1, wherein the frequency domain of the touch vibration wave is a low frequency (LF), a very low frequency (VLF), a ultra low frequency (ULF), or a super low frequency (SLF), and the frequency domain of the projection light ray is a medium frequency (MF), a high frequency (HF), a very high frequency (VHF), a ultra high frequency (VHF), or a super high frequency (SHF).

5. The projection light touch apparatus according to claim 1, wherein the imaging unit is a camera, a charge-coupled device (CCD), a complementary metal-oxide-semiconductor (CMOS) active pixel sensor, or a time-of-flight (TOF) sensor.

6. A scanning-type light touch apparatus, comprising:
a scanning unit, emitting a scanning beam and generating multiple scanning spots;
an optical signal processing unit, receiving multiple pieces of reflection light information that are respectively reflected from the scanning spots, wherein the optical signal processing unit can further analyze the pieces of reflection light information to correspondingly generate multiple pieces of analysis spot information, wherein the pieces of analysis spot information comprise at least one piece of touch vibration information, and the at least one piece of touch vibration information comprises a touch vibration wave whose frequency domain is different from a frequency domain of the scanning beam; and
a position processing unit, electrically connected to the optical signal processing unit, and receiving the at least one piece of touch vibration information, wherein the position processing unit calculates a touch position according to the at least one piece of touch vibration information, wherein the touch position is a relative epicenter position at which the touch vibration wave is generated.

7. The scanning-type light touch apparatus according to claim 6, wherein the scanning unit is a laser range scanner, and the scanning beam is a laser beam.

8. The scanning-type light touch apparatus according to claim 6, wherein the scanning unit is a light modulation unit, the scanning beam is a modulation signal beam, and each piece of reflection light information is a piece of modulation reflection light information.

9. The scanning-type light touch apparatus according to claim 8, wherein the optical signal processing unit demodulates the pieces of modulation reflection light information according to a Fourier transformation formula, to generate the pieces of analysis spot information.

10. The scanning-type light touch apparatus according to claim 6, wherein the frequency domain of the touch vibration wave is a low frequency (LF), a very low frequency (VLF), a ultra low frequency (ULF), or a super low frequency (SLF), and the frequency domain of the scanning beam is a medium frequency (MF), a high frequency (HF), a very high frequency (VHF), a ultra high frequency (VHF), or a super high frequency (SHF).

* * * * *